Aug. 12, 1930.  C. KLEIN  1,772,951
TRUCK
Filed July 26, 1928
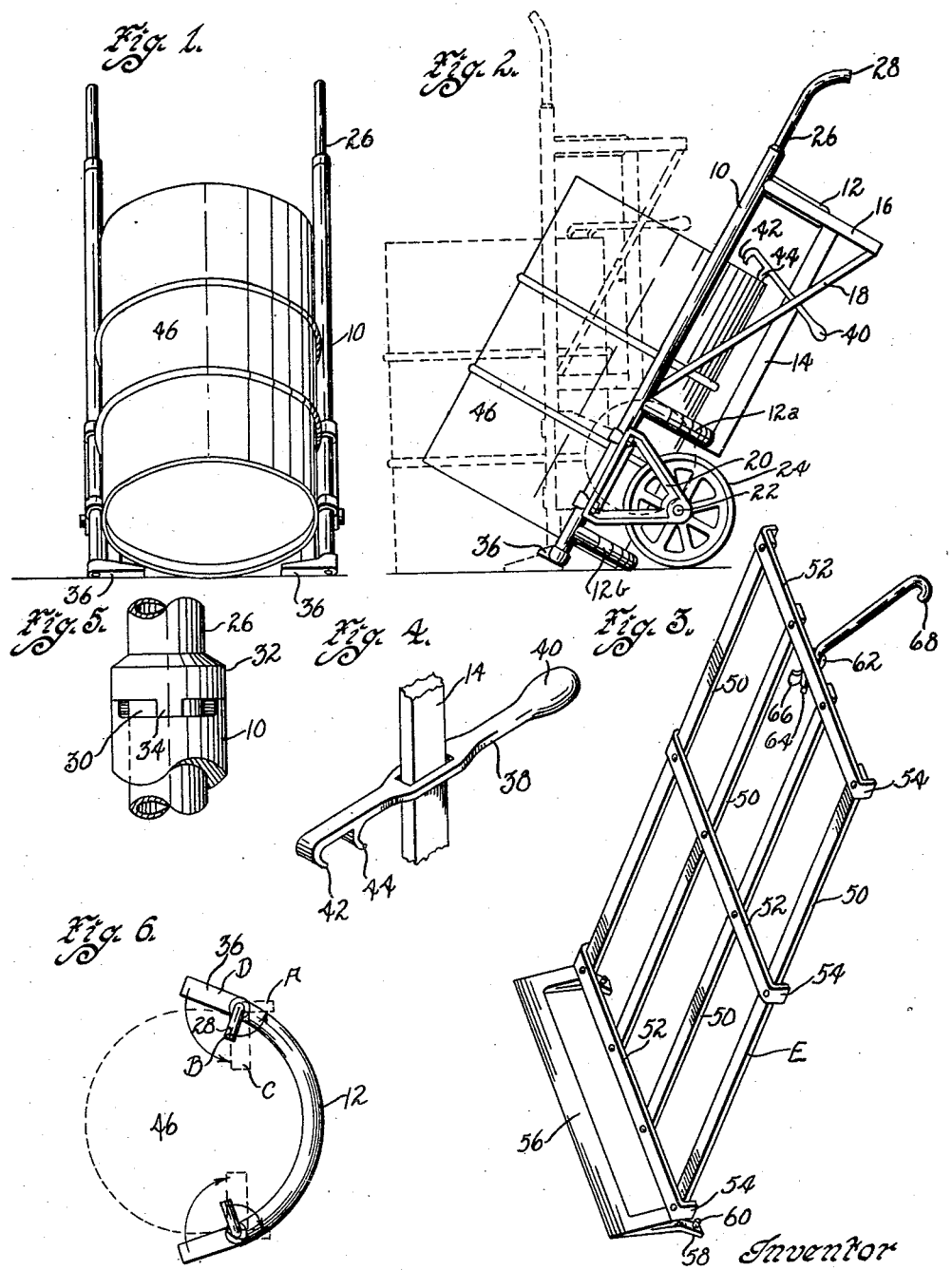
Inventor
Carl Klein
by Bair, Freeman & Sinclair
Attorneys
Witness
Vinton Read Patented Aug. 12, 1930

1,772,951

UNITED STATES PATENT OFFICE

CARL KLEIN, OF WICHITA, KANSAS

TRUCK

Application filed July 26, 1928. Serial No. 295,408.

My invention relates to an improvement in hand trucks, and consists particularly in providing the combination of a truck having a frame with a detachable frame, said frames having coacting parts, whereby one may be mounted on the other, one of said frames being shaped to fit barrels and the like and the other lying substantially in a single plane to fit boxes or flat-sided objects, whereby a truck may be quickly and readily adapted for the convenient handling of barrels or of boxes.

My object is to provide such a device in which the coacting parts are so constructed and assembled as to afford a strong, rigid structure when the attachment frame is in use.

With these and other objects in view, my invention consists in the construction, arrangement and combination of the various parts of my truck whereby the objects contemplated are attained, as hereinafter more fully set forth, pointed out in my claims, and illustrated in the accompanying drawings, in which:

Figure 1 shows a front elevation of a truck having a barrel tilted for mounting thereon.

Figure 2 shows a side elevation of the same, the truck frame being of the type adapted to fit barrels.

Figure 3 is a perspective view of a frame adapted to be attached to the truck shown in Figures 1 and 2.

Figure 4 is a perspective view, parts being broken away, of a portion of the truck shown in Figure 2, illustrating the hook for engaging the chime of a barrel.

Figure 5 is a detail view partly in section showing parts broken away for illustrating the manner of mounting the rotary members connecting the handles and toes on the truck shown in Figures 1 and 2.

Figure 6 is an end elevation of the truck frame illustrating the positions of the handles and toes thereon.

In the drawings herewith, I have shown such a truck having a frame composed of spaced, longitudinal side members indicated in the drawings by the reference numeral 10.

These members 10 are connected by rigid cross frame members 12, 12ª and 12ᵇ spaced from each other lengthwise of the truck, and inclined from their central portions upwardly and laterally to the respective side members 10. The frame members 12 are thus constructed and adapted to approximately fit barrels and similar articles.

The two rear frame members 12ª and 12 are connected by a central, longitudinal frame member 14.

Near what may be called the rear end of the truck, it is provided with supporting legs 16 extending downwardly from the members 10. The legs 16 may be braced to the members 10 by means of braces 18.

Rigidly attached to the frame members 10 near the front ends thereof are downwardly extended bearing brackets 20 in which are journaled the axles 22 of supporting wheels 24.

Suitably journaled on the members 10 for rotation are members 26. In the particular form in which the invention is illustrated here, the members 10 are tubular and the members 26 are tubular also, and are received in the members 10. The members 26 have at their rear ends curved portions 28 forming handles.

In the upper ends of the members 10 are circumferentially elongated notches 30.

On the respective members 26 are collars 32 bearing against the upper ends of the members 10 and provided with lugs 34 which travel in the notches 30 and limit the rotary movement of the members 26 in the members 10.

Fixed to the lower ends of the members 26 are angularly projected toes 36. These toes 36 are so arranged that when the handles 28 are in their normal position for manipulating and controlling the truck, the toes 36 incline inwardly toward each other, whereas when the handles are swung inwardly, as for instance from the position A shown in Figure 6 to the position B shown in such figure, the toes move from the position C to the position D.

Slidably mounted on the member 14 (see Figures 2 and 4) is a barrel chime engager 38, which in the particular form here shown, which is simply illustrative, comprises a bar-like member, having at one end a handle portion 40 and at the other end one or more hook members such for instance as shown at 42 and 44.

The truck, as I have so far described it, is very similar to that of my prior application, Serial Number 187,535, filed April 29, 1927, and is adapted primarily for handling barrels.

I shall briefly describe the manner of its use for handling barrels.

The truck is pushed close to the barrel 46 and then swung from its normal, horizontal position to substantially vertical position adjacent to the barrel 46 with the toes 36 on opposite sides of the barrel, as shown for instance in dotted lines in Figure 2.

The chime engager 38 is slid on the member 14 to proper position and one of the hooks 42—44 is engaged over the chime.

The workman then pulls the truck toward him for tilting the barrel 46 to the full line position shown in Figure 2. The barrel tilts on the ground. This movement causes the barrel to slide slightly with relation to the truck, so that the toes 36 will be below the level of the bottom of the barrel.

The workman then moves the handles 28 for rotating the members 26 and turning the toes 36 under the barrel 46.

The truck can then be tilted rearwardly and downwardly until it rests wholly on the wheels 24.

Very heavy barrels 46 can be conveniently handled by one man with a truck of this kind.

I shall now describe the attachment which in combination with the truck comprises the subject matter of my present invention.

I have found that in some plants both barrels and boxes are handled. Sometimes a large number of barrels will have to be handled and then a large number of boxes. Ordinary trucks can be used for the boxes. My truck, as herein described, can be very conveniently used for the barrels. Sometimes a plant owner does not desire to keep on hand two kinds of trucks. By providing the attachment herein described, my improved truck can be readily adapted for use in handling boxes and flat-sided articles.

The attachment is illustrated in Figure 3. It comprises a rectangular frame having the longitudinal members 50 and the cross members 52 connected therewith and provided with the down-turned ends 54.

At what is the forward or lower end of the attachment, when it is assembled on the truck, there is provided an angularly arranged nose 56 of the kind provided on many ordinary trucks.

Secured to the upper end member 52 is a U-bolt 62 through which loosely extends a rod 64, one end of which is threaded to receive a wing nut 66, and the other end of which is provided with a hook 68.

At the lower or forward end of the attachment are the rearwardly or downwardly projecting flat pieces 58, having the upwardly and rearwardly projecting lugs 60. I am describing the device as though it were on the truck and the truck were in the position shown in Figure 2.

In mounting the attachment on the truck, the attachment is placed on the truck and slid until the lugs 60 enter holes 63 provided therefor in the under sides of the toes 36 in line with the members 26. (See Figures 1 and 3.) The down-turned ends 54 hang over the members 10. The hook 68 is adjusted over the central portion of the upper member 12 and the wing nut 66 tightened.

When the attachment is on the truck, the toes 36 stand in the same position they occupy when a barrel is being carried on the truck, and this leaves the handles 28 in proper position for moving the truck.

When the attachment shown in Figure 3 is thus assembled on the truck, the truck can be used for handling boxes in the same manner as any ordinary truck, and I have thus provided by means of the attachment a way in which my barrel truck can be readily adapted for use for handling boxes and the like at a very modest expense with very little labor, and without involving much labor for assembling the attachment on the truck.

I claim as my invention:

1. In a structure of the class described, the combination of a truck having a frame adapted to fit barrels and including spaced, longitudinal, parallel side members, toes supported at the forward ends of said side members having in their forward surfaces recesses, said truck frame having a cross member at its upper end, said truck being combined with a substantially rectangular frame having an angularly projected nose at its forward end and provided with angularly projected plates having lugs adapted to be received in said recesses, and additional means for locking said rectangular frame to the truck.

2. In a structure of the class described, the combination of a truck having a frame adapted to fit barrels and including spaced, longitudinal, parallel side members, toes supported at the forward ends of said side members having in their forward surfaces recesses, said truck frame having a cross member at its upper end, said truck being combined with a substantially rectangular frame having an angularly projected nose at its forward end and provided with angularly projected plates having lugs adapted to be received in said recesses, means for adjustably locking said attachment frame to the truck, comprising a hook member having a shank slidably supported on said attachment frame and means for adjusting said shank on the attachment frame.

3. In a structure of the class described, the combination of a truck frame having side members and an auxiliary frame adapted to overlie the truck frame and means for detachably positioning the auxiliary frame on the truck frame comprising sockets in the lower ends of said members, upwardly extending pins on the auxiliary frame for positioning the lower end of the auxiliary frame relative to the truck frame, and thereby limiting the movement of the auxiliary frame relative to the main frame in one direction and a bolt and nut connection between the two frames arranged to move the auxiliary frame relative to the main frame when the nut is tightened until stopped by the sockets and pins, said bolt and nut connection serving to position the other end of the auxiliary frame and prevent its downward movement relative to the truck frame.

Des Moines, Iowa, June 18, 1928.

CARL KLEIN.